(12) United States Patent
Lee

(10) Patent No.: US 9,528,674 B2
(45) Date of Patent: Dec. 27, 2016

(54) HEAD LAMP FOR CAR

(71) Applicant: HYUNDAI MOBIS CO., LTD., Seoul (KR)

(72) Inventor: Hyun Soo Lee, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 105 days.

(21) Appl. No.: 14/523,697

(22) Filed: Oct. 24, 2014

(65) Prior Publication Data

US 2016/0061399 A1    Mar. 3, 2016

(30) Foreign Application Priority Data

Sep. 1, 2014    (KR) .................. 10-2014-0115298

(51) Int. Cl.
*G02B 19/00* (2006.01)
*F21S 8/10* (2006.01)
*G02B 3/04* (2006.01)

(52) U.S. Cl.
CPC .......... *F21S 48/1225* (2013.01); *F21S 48/115* (2013.01); *F21S 48/1154* (2013.01); *F21S 48/1266* (2013.01); *F21S 48/1291* (2013.01); *G02B 3/04* (2013.01); *G02B 19/0014* (2013.01); *G02B 19/0061* (2013.01)

(58) Field of Classification Search
CPC ........................... F21S 48/1225; F21S 48/115
See application file for complete search history.

(56) References Cited

U.S. PATENT DOCUMENTS

| | | | | |
|---|---|---|---|---|
| 3,751,138 A * | 8/1973 | Humphrey | ....... | B29D 11/00855 351/159.42 |
| 2014/0175978 A1* | 6/2014 | Kobayashi | ........... | B60Q 1/1423 315/82 |

FOREIGN PATENT DOCUMENTS

| JP | 2013-54963 A | 3/2013 |
|---|---|---|
| KR | 10-2011-0002662 A | 1/2011 |
| KR | 10-1339159 B1 | 12/2013 |

* cited by examiner

*Primary Examiner* — Sharon Payne

(57) ABSTRACT

Disclosed is a head lamp for a car having asymmetric magnifications for upper, lower, left, and right lens standards, and the head lamp includes: a light source; and an aspheric lens disposed in a front direction of the light source, and configured to have different horizontal and vertical magnifications.

4 Claims, 7 Drawing Sheets

HEAD LAMP FOR CAR

CROSS-REFERENCE TO RELATED APPLICATIONS

This application claims priority to and the benefit of Korean Patent Application No. 10-2014-0115298 filed in the Korean Intellectual Property Office on Sep. 1, 2014, the entire contents of which are incorporated herein by reference.

TECHNICAL FIELD

The present invention relates to a head lamp for a car, and more particularly, to a head lamp for a car, which has asymmetric magnifications for upper, lower, left, and right lens standards.

BACKGROUND ART

In general, a car is provided with various lamps, which have a lighting function that allows a driver to easily confirm objects positioned around the car when the car travels at night, and a signal function that informs a travelling state of a car of a driver to drivers of other cars or other road users. For example, a head lamp, a fog lamp, and the like are provided for the purpose of the lighting function, and a turn signal lamp, a tail lamp, a brake lamp, a side marker, and the like are provided for the purpose of the signal function.

In general, a light source, such as a halogen lamp or a high intensity discharge (HID) lamp, has been mainly used as the lamp for a car.

Recently, as the light source, a light emitting diode is being used, a color temperature of the light emitting diode (LED) is about 5,500 K, which is close to a color temperature of sun light, so as to minimize eye strain, and the light emitting diode minimizes a size of the lamp so as to increase a degree of design freedom of the lamp, and also has economic efficiency because of a semi-permanent lifespan.

An attempt has been made to overcome a complicated configuration of the lamp and an increase in process steps in the related art by introducing a light emitting diode, and there is a tendency to extend the lifespan of the lamp using the characteristics of the light emitting diode and overcome problems in terms of a space of the lamp using a small size of the light emitting diode.

In the meantime, a head lamp among various lamps for a car uses various beam patterns, compared to other lamps. For example, a head lamp radiates light having an optimum beam pattern according to a travelling state of a car, for example, a travelling speed, a travelling direction, a road state, and surrounding brightness, to sufficiently secure a view of a driver and prevent drivers of surrounding cars from being blind.

When the light emitting diode is used, one or more light emitting diodes may be used in order to radiate light in each beam pattern and secure a sufficient light quantity.

However, when a size of an aspheric lens is decreased in a head lamp in the related art, efficiency considerably deteriorates, and a size of an optical system is large, so that there is a problem in that it is difficult to mount a plurality of modules within the lamp.

Related Art Literature

[Patent Document] Korean Patent No. 10-1339159

SUMMARY OF THE INVENTION

The present invention has been made in an effort to provide a head lamp for a car, in which a lens mounted inside the head lamp is formed in an asymmetric structure to provide cut-off maintenance and large diffusion functions which have been performed by a reflective surface and a shield.

The present invention has also been made in an effort to reduce manufacturing cost by decreasing the number of components by removing a reflective surface and a shield.

An exemplary embodiment of the present invention provides a head lamp for a car, including: a light source; and an aspheric lens disposed in a front direction of the light source, and configured to have different horizontal and vertical magnifications.

The light source may be a light emitting diode (LED) device.

The aspheric lens may be an anamorphic lens.

The light source may move from a focus of the aspheric lens by 2 mm or more in an up direction to emit light.

The aspheric lens may have a spherical curve formed through an equation, $$Z = \frac{C_X X^2 + C_X Y^2}{1 + \sqrt{1 - [1 + K_X]C_X^2 X^2 - (1 + K_Y C_Y^2 Y^2)}} + \sum_{N=2}^{\infty} 10 A_{2N}[(1 - B_{2N})X^2 + (1 + B_{2N})Y^2]^N,$$

in which C is curvature, K is conic constant, A is Coefficient of high order term of vertical aspherical surface, and B is Coefficient of high order term of horizontal aspherical surface.

According to the exemplary embodiments of the present invention, in the head lamp for a car, a shape of the lens included in the head lamp is configured in an asymmetric structure, thereby diffusing light of left and right lights.

According to the exemplary embodiments of the present invention, it is possible to reduce manufacturing cost according to a decrease in the number of components by removing a reflective surface and a shield, and provide cut off maintenance and large diffusion functions which have been performed by the reflective surface and the shield.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
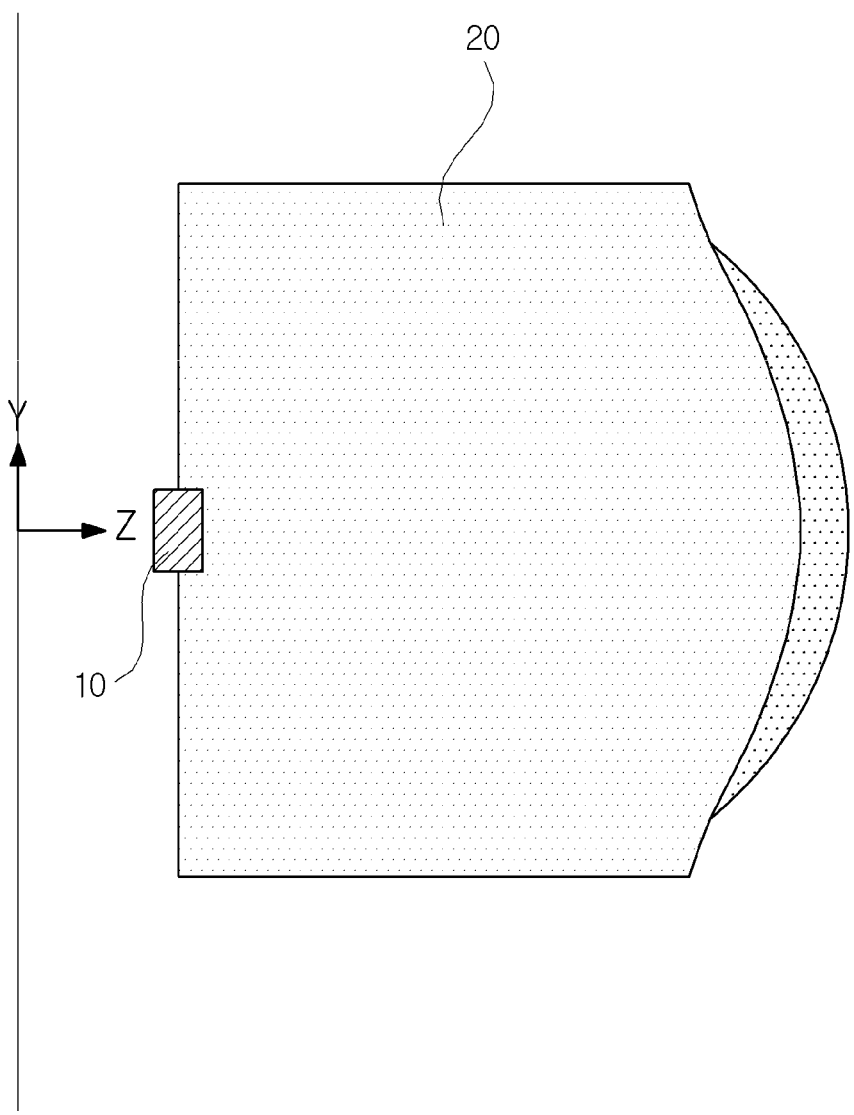
FIG. 1 is a diagram illustrating an example of upper and lower parts of an aspheric lens of a head lamp for a car according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment according to the present invention will be described in detail with reference to the accompanying drawings. First, in denoting reference numerals to constituent elements of respective drawings, it should be noted that the same elements will be designated by the same reference numerals although they are shown in different drawings. In the following description of the present invention, a detailed description of known configurations or functions incorporated herein will be omitted when it is determined that the detailed description may make the subject matter of the present invention unclear. An exemplary embodiment of the present invention will be described below, but the technical spirit of the present invention is not limited thereto and may be modified and variously implemented by those skilled in the art.

Figure 2:
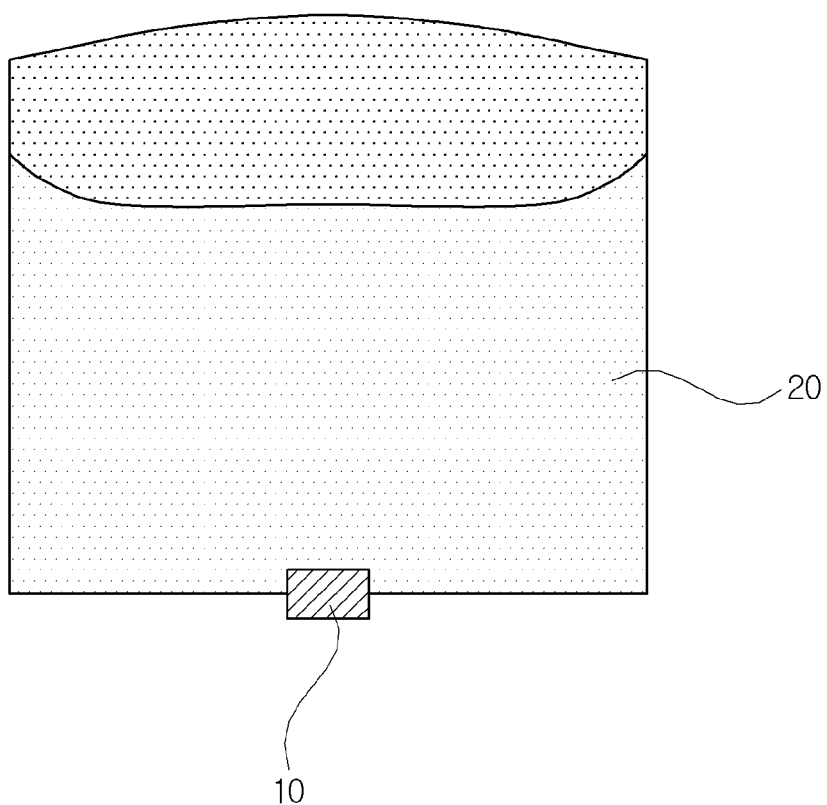
FIG. 2 is a diagram illustrating an example of left and right parts of the aspheric lens of the head lamp for the car according to the exemplary embodiment of the present invention.
Figure 3:
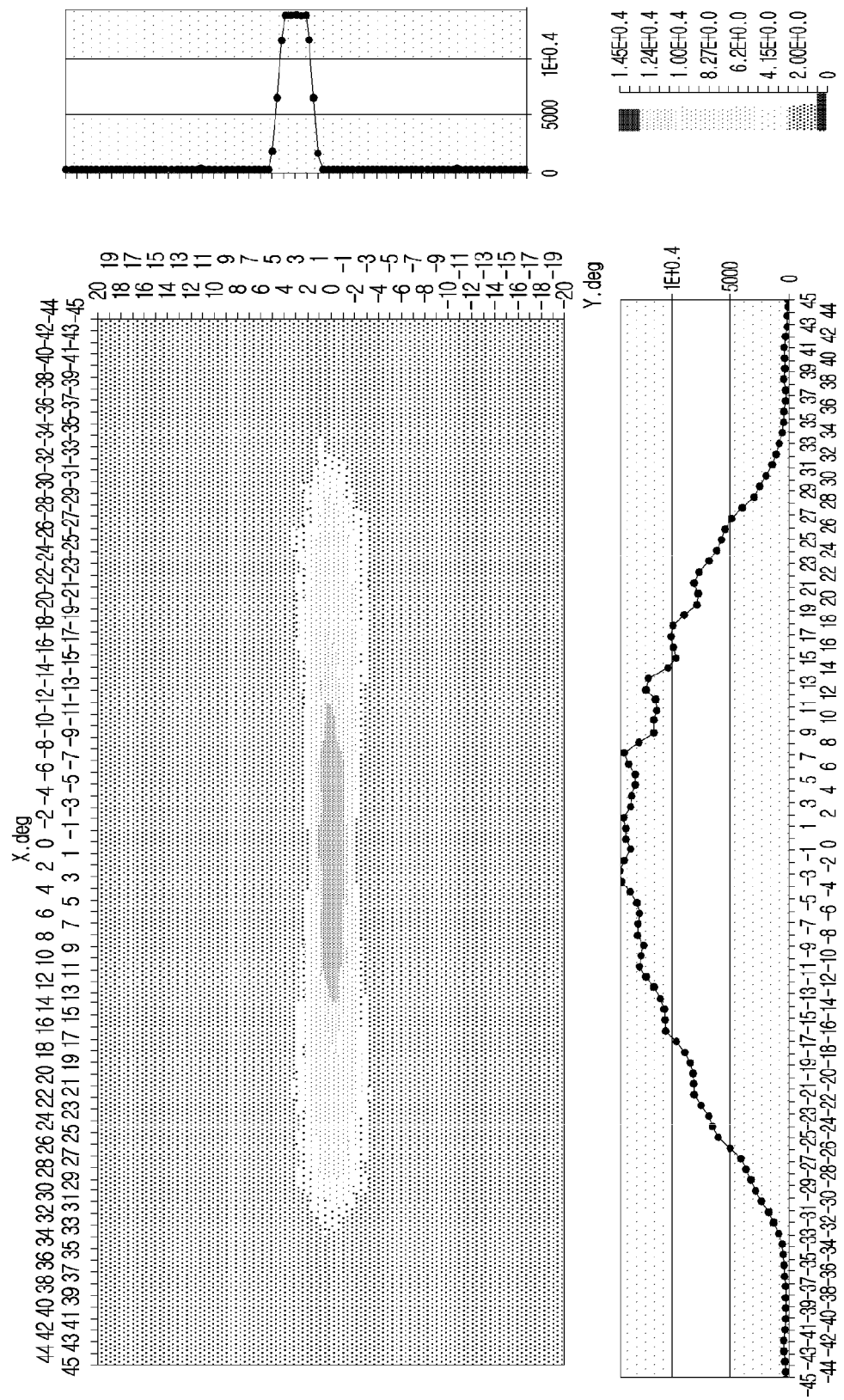
FIG. 3 is a diagram illustrating an example of a state where light is emitted from a focus of the head lamp for the car according to the exemplary embodiment of the present invention toward the lens.

FIG. 1 is a diagram illustrating an example of upper and lower parts of an aspheric lens of a head lamp for a car according to an exemplary embodiment of the present invention, FIG. 2 is a diagram illustrating an example of left and right parts of the aspheric lens of the head lamp for the car according to the exemplary embodiment of the present invention, and FIG. 3 is a diagram illustrating an example of a state where light is emitted from a focus of the head lamp for the car according to the exemplary embodiment of the present invention toward the lens.

As illustrated in FIGS. 1 to 3, a head lamp for a car according to an exemplary embodiment of the present invention includes a light source 10, and an aspheric lens 20 disposed in a front direction of the light source 10.

The light source 10 may use a light emitting diode (LED) as an element, and may be a directional light source, which radiates light in a predetermined direction.

The light source 10 may be a white LED, and a plurality of light emission chips may be installed in one semiconductor light emission device.

In this case, the light source 10 is vulnerable to high temperature, so that performance of the light source 10 may deteriorate. Accordingly, a heat radiating panel (not illustrated) for preventing a temperature increase by heat discharged from the light source 10 may be used.

The aspheric lens 20 is installed in the front direction of the light source 10. The aspheric lens 20 is configured so that magnifications in a horizontal direction and a vertical direction are different.

That is, the aspheric lens 20 is configured so that a vertical ratio is relatively smaller than a horizontal ratio similar to an anamorphic lens.

For example, a horizontal ratio of the aspheric lens 20 may be formed to be greater than a vertical ratio of the aspheric lens 20, specifically, like that a ratio of the horizontal length to a vertical length of the aspheric lens 20 is 6:4 or 7:3. Accordingly, the aspheric lens 20 may be formed in a rectangular shape in which a horizontal length is greater than a vertical length.

Accordingly, for light emitted from the light source 10, light diffused in up and down directions is restricted while upper and lower focuses are equally maintained. By contrast, left and right focuses are widely spread, so that light may be diffused in left and right directions.

In this case, in an external surface curve of the aspheric lens 20, a vertical focus needs to be restricted, and a horizontal focus needs to be widely spread. Accordingly, the aspheric lens 20 is designed based on a hyperbola capable of creating a virtual image.

An equation for satisfying the aforementioned condition is expressed below.

$$Z = \frac{C_x x^2 + C_x y^2}{1 + \sqrt{1 - [1 + K_X]C_x^2 x^2 - (1 + K_Y c_y^2 y^2)}} + \sum_{N=2}^{\infty} 10 A_{2n} [(1 - B_{2n})x^2 + (1 + B_{2n})n^2]^n$$

C: curvature
K: conic constant
A: coefficient of high order term of vertical aspherical surface
B: coefficient of high order term of horizontal aspherical surface The equation is obtained by referring to an equation of implementing a general conic curve and an equation of implementing an aspherical curve.

That is, an equation of implementing a general conic curve is expressed below.

$$\frac{Z = cr^2}{1 + \sqrt{1 - (1+k)c^2 r^2}}$$

k=0: sphere
−1<k<0: ellipse
k=−1: parabola
k<−1: hyperbola
k>1: not a true conic section An equation of implementing an aspherical curve is expressed below.

$$Z = \frac{cr^2}{1+\sqrt{1-(1+k)c^2r^2}} + \sum_{n=2}^{\infty} 10 C_{2n} r^{2n}$$

c: curvature
K: conic constant
C: coefficient of high order term of aspherical surface As can be seen from the equation of the general conic curve and the equation of the aspherical curve, the aspheric lens is solidified by revolving the aspherical curve of the aspheric lens 20, which is designed in a two-dimensional plane, based on one axis, so that it is possible to configure the general aspheric lens having one focus.

Figure 4:
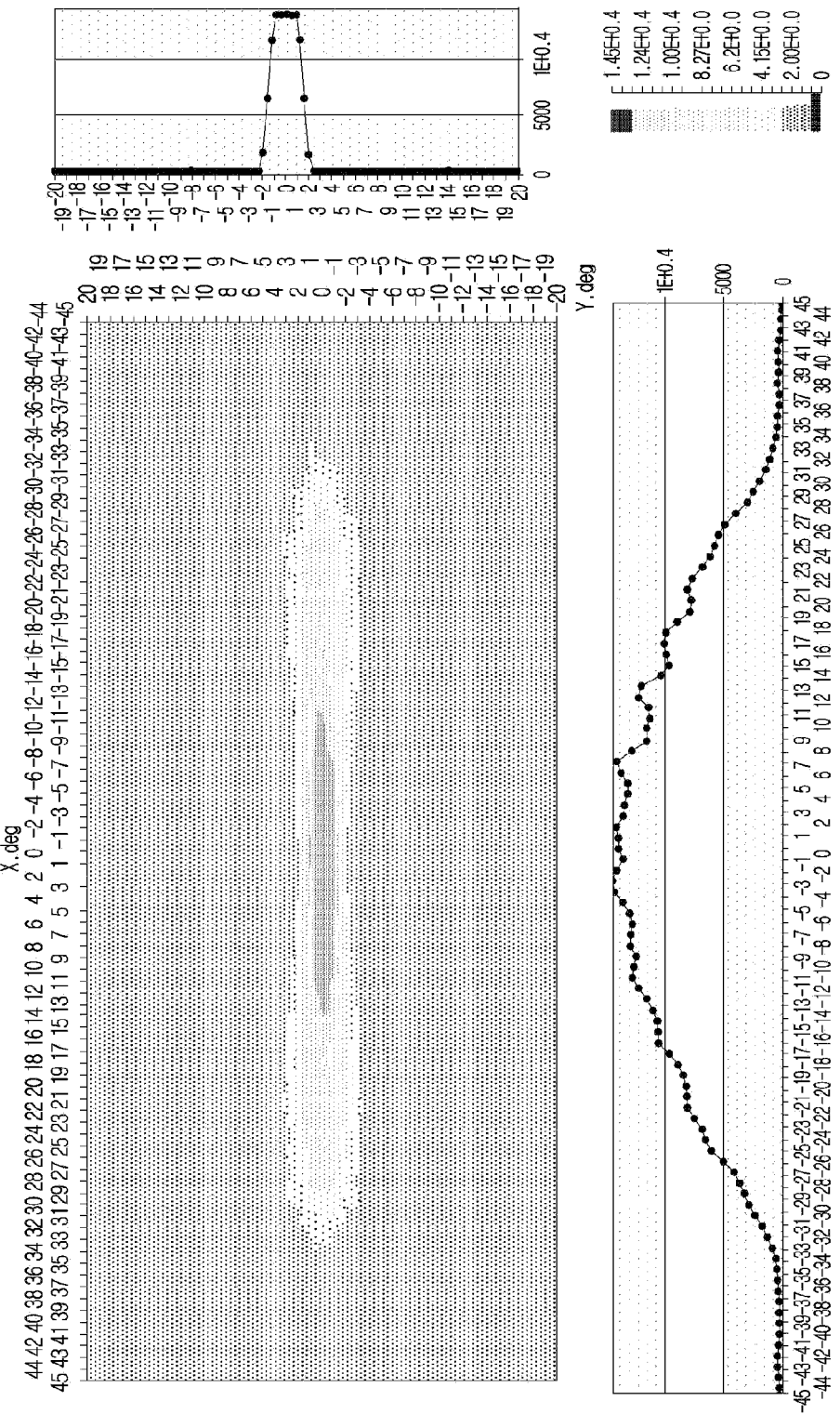
FIG. 4 is a diagram illustrating a light emission state when a light source according to the exemplary embodiment of the present invention is located at a regular position.
Figure 5:
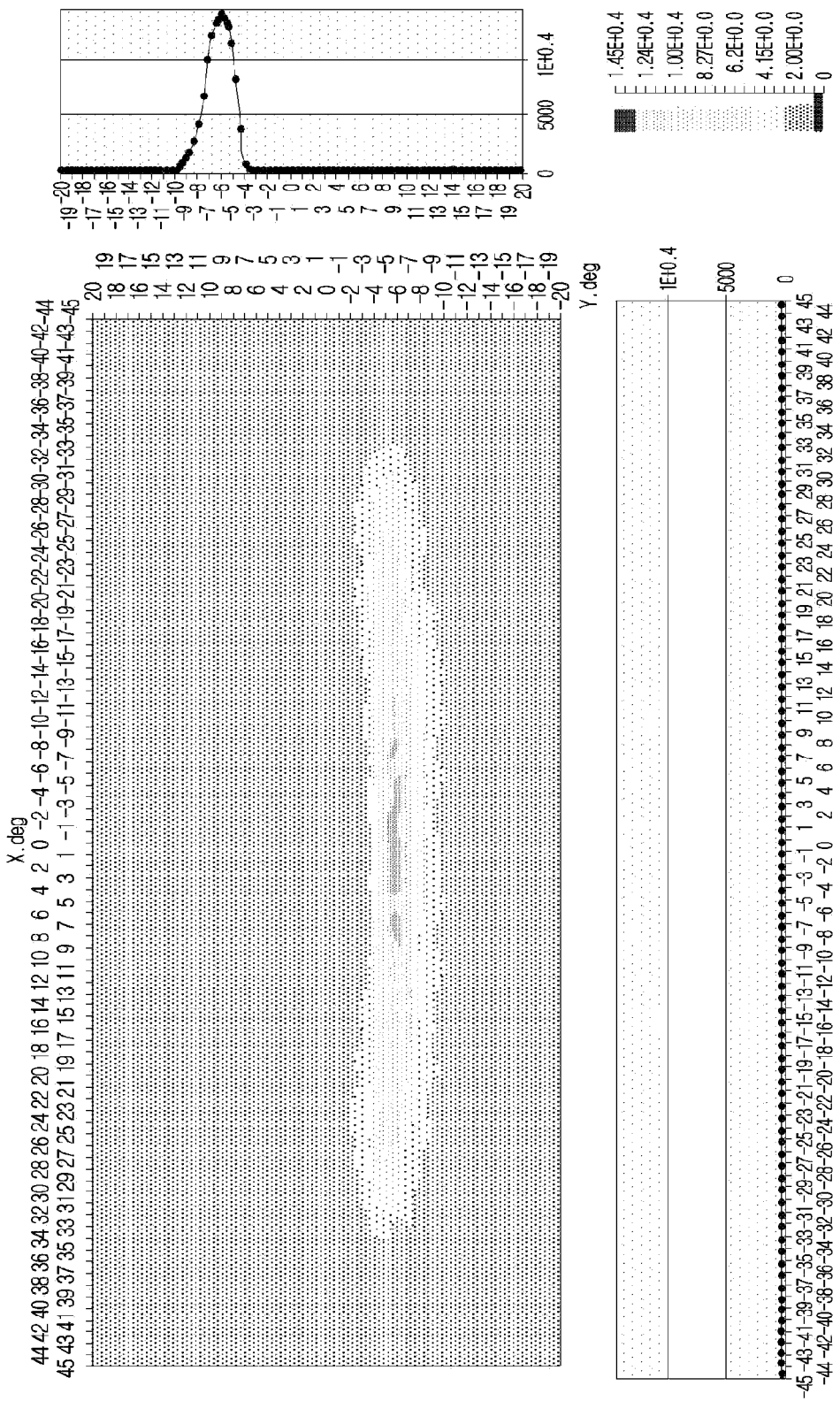
FIG. 5 is a diagram illustrating a light emission state when a light source according to the exemplary embodiment of the present invention is located at a position 2 mm spaced apart from the focus in an up direction.
Figure 6:
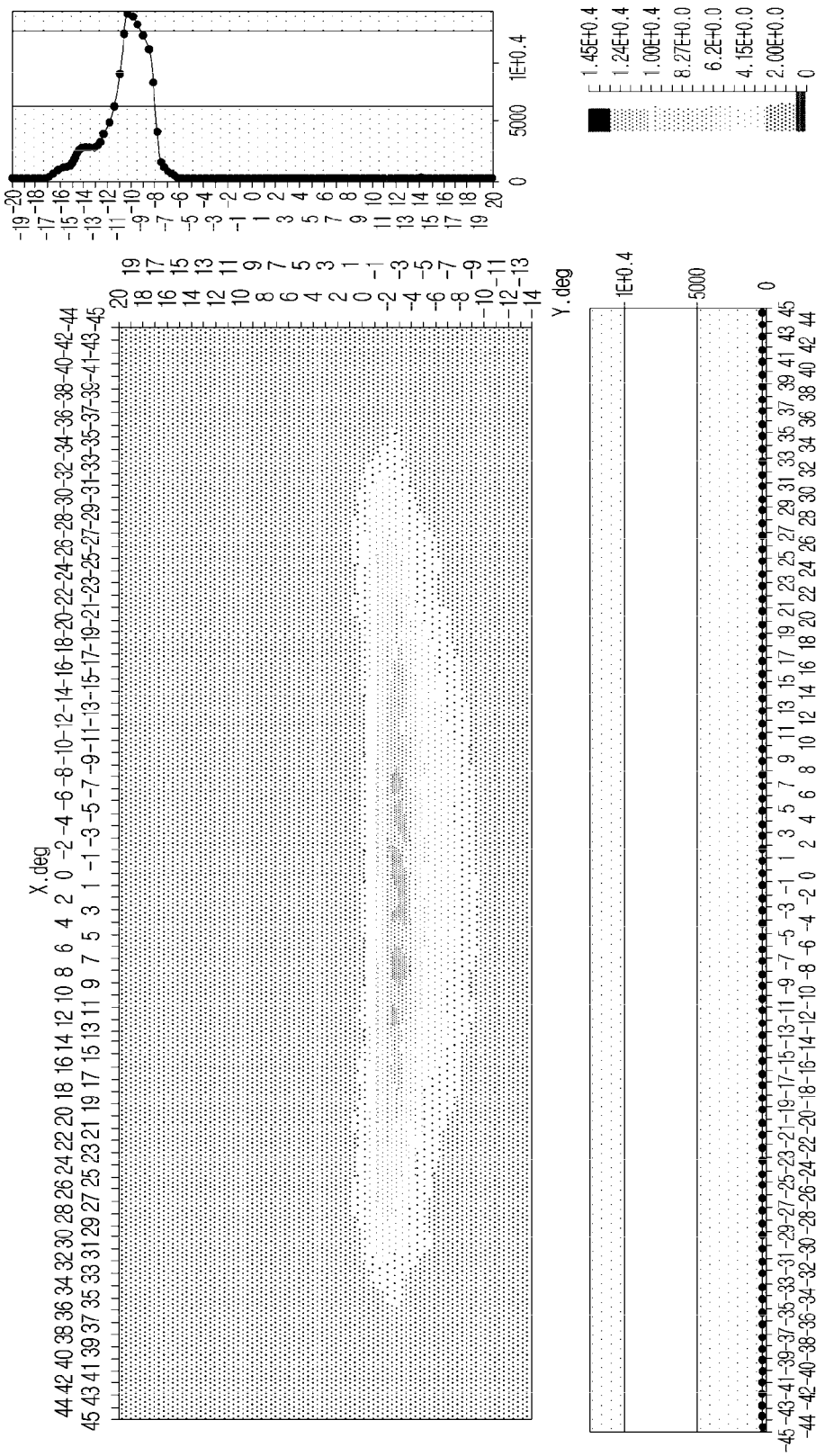
FIG. 6 is a diagram illustrating a light emission state when a light source according to the exemplary embodiment of the present invention is located at a position 3 mm spaced apart from the focus in an up direction.
Figure 7:
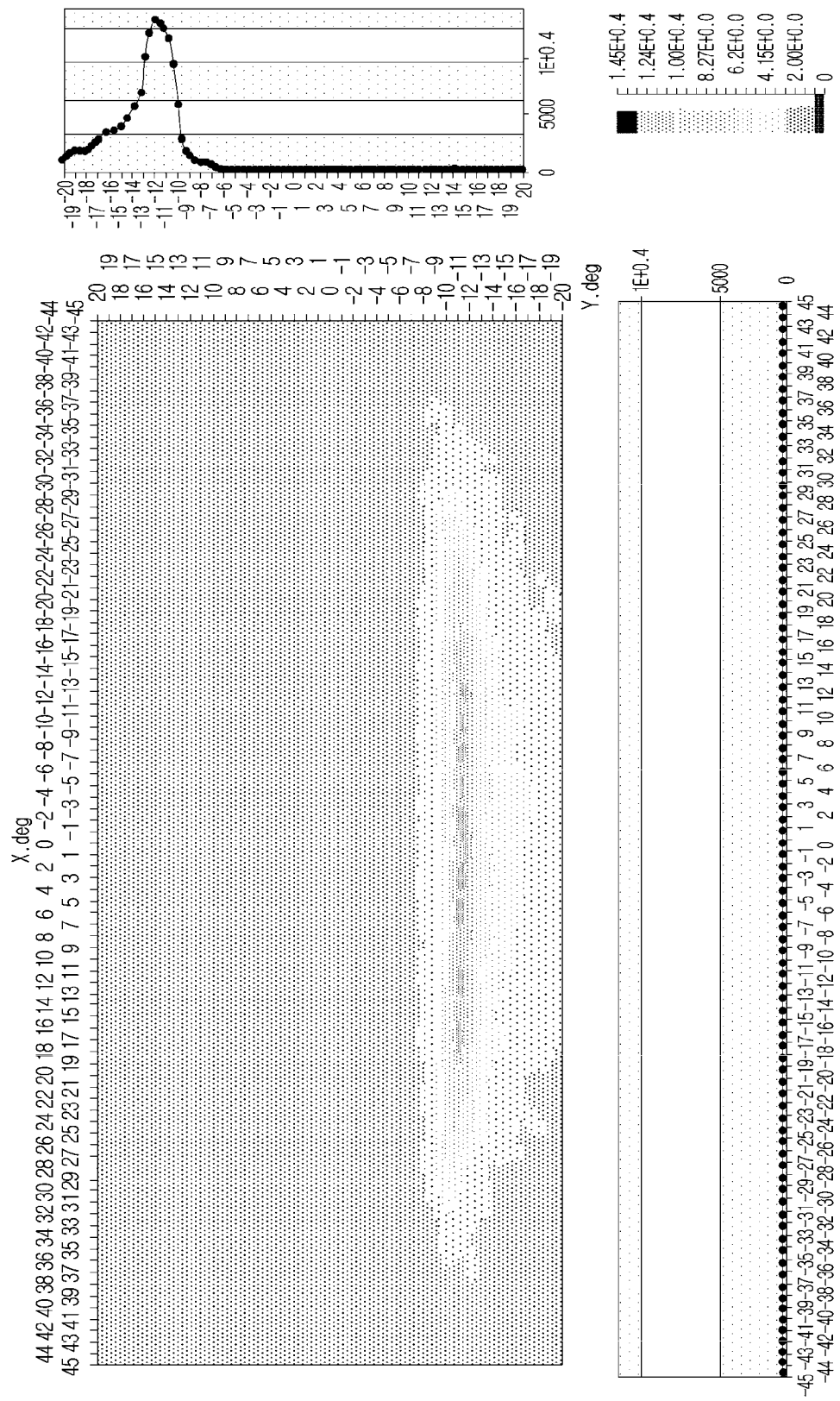
FIG. 7 is a diagram illustrating a light emission state when a light source according to the exemplary embodiment of the present invention is located at a position 4 mm spaced apart from the focus in an up direction.

FIG. 4 is a diagram illustrating a light emission state when a light source according to the exemplary embodiment of the present invention is located at a regular position, FIG. 5 is a diagram illustrating a light emission state when a light source according to the exemplary embodiment of the present invention is located at a position 2 mm spaced apart from the focus in an up direction, FIG. 6 is a diagram illustrating a light emission state when a light source according to the exemplary embodiment of the present invention is located at a position 3 mm spaced apart from the focus in an up direction, and FIG. 7 is a diagram illustrating a light emission state when a light source according to the exemplary embodiment of the present invention is located at a position 4 mm spaced apart from the focus in an up direction.

Referring to FIGS. 4 to 7, when the light source 10 is located at a regular position, light passing through the aspheric lens has a shape generally diffused from a center of a beam pattern, but when the light source 10 is located at a position spaced apart from the focus by 2 mm or more in an up direction, a cut-off line is formed at an upper end, and there is a phenomenon in which light is spread at a lower end.

As described above, it is possible to form a beam pattern by adjusting a shape of the aspheric lens 20 and a position of the light source 10, and thus it is possible to omit a reflective surface and a shield.

Accordingly, a magnification of the aspheric lens 20 of the head lamp for the car according to the exemplary embodiment of the present invention is different in the vertical direction and the horizontal direction, thereby improving efficiency and performance of an optical system, and manufacturing the head lamp with a smaller size while having the same efficiency.

Light is directly emitted from the light source 10 toward the aspheric lens 20, so that it is possible to remove a reflective surface and a shield, thereby expecting a decrease in the number of components according to a decrease in the number of processes.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A head lamp for a car, comprising:
a light source; and
an aspheric lens disposed in front of the light source, and configured to have different magnifications in first and second directions,
wherein the aspheric lens has an aspherical surface Z that satisfies the following equation, $$Z = \frac{C_X X^2 + C_X Y^2}{1+\sqrt{1-[1+K_X]C_X^2 X^2 - (1+K_Y c_Y^2 Y^2)}} + \sum_{N=2}^{\infty} 10 A_{2N}[(1-B_{2N})X^2 + (1+B_{2N})Y^2]^N,$$

where X is a coordinate of the aspherical surface in the first direction, Y is a coordinate of the aspherical surface in the second direction, $C_x$ is a curvature in the first direction, $C_Y$ is a curvature in the second direction, $K_x$ is a conic constant in the first direction, $K_Y$ is a conic constant in the second direction $A_{2N}$ is a coefficient of a hi h order term of a first aspherical surface, and $B_{2N}$ is a coefficient of a high order term of a second aspherical surface.

2. The head lamp of claim 1, wherein the light source is a light emitting diode (LED) device.

3. The head lamp of claim 1, wherein the aspheric lens is an anamorphic lens.

4. The head lamp of claim 1, wherein the light source moves from a focus of the aspheric lens by 2 mm or more in the second direction to emit light.

* * * * *